United States Patent [19]
Basile

[11] 4,249,305
[45] Feb. 10, 1981

[54] TOOL FOR USE IN CLEAVING FIBER OPTIC ELEMENTS

[75] Inventor: Rocco F. Basile, Roselle, N.J.

[73] Assignee: Thomas & Betts Corporation, Raritan, N.J.

[21] Appl. No.: 17,345

[22] Filed: Mar. 5, 1979

[51] Int. Cl.³ ............................................. B26F 3/00
[52] U.S. Cl. ................................. 30/164.9; 225/96.5; 225/93
[58] Field of Search ................... 30/164.9, 164.95, 92, 30/93, 94, 95, 96, 97; 225/2, 96.5, 93

[56] References Cited
U.S. PATENT DOCUMENTS

| | | | |
|---|---|---|---|
| 2,199,807 | 5/1940 | Moreira | 30/164.9 |
| 2,317,944 | 4/1943 | Schaefer | 30/96 X |
| 2,425,093 | 8/1947 | Fosler | 30/164.95 |
| 2,735,175 | 2/1956 | Tallman | 30/96 X |
| 3,315,355 | 4/1967 | Osburn | 30/92 X |
| 4,154,385 | 5/1979 | Lewis | 225/96.5 |

*Primary Examiner*—Jimmy C. Peters
*Attorney, Agent, or Firm*—James J. Daley; Robert M. Rodrick; Jesse Woldman

[57] ABSTRACT

An improved tool is disclosed for use in cleaving fiber optic elements preparatory to a splice for joining of two such fiber optic elements. The improved tool comprises support means having a longitudinal axis for supporting the fiber optic element therealong, grooving means for forming a groove in the surface of the fiber optic element, engagement causing means for causing engagement of the grooving means with the fiber optic element, and mounting means for mounting the grooving means to revolve about the longitudinal axis of the support means to circumferentially groove a fiber optic element about its entire circumference. The engagement causing means is movable between a first position in which the grooving means is adapted to engage the fiber optic element and a second position in which the grooving means is adapted to be spaced from the fiber optic element. Also, the engagement causing means is normally biased towards the first position.

16 Claims, 4 Drawing Figures

TOOL FOR USE IN CLEAVING FIBER OPTIC ELEMENTS

BACKGROUND OF THE INVENTION

The present invention is directed to cleaving of fiber optic elements, and more particularly to an improved tool which is especially useful in cleaving fiber optic elements preparatory to subsequent splicing thereof.

In the field of fiber optics, it is often necessary to join or splice together two optic elements by abutting the ends thereof to provide a high efficiency, light coupling therebetween. An inherent problem which has existed in this field involves the achievement of extremely accurate axial alignment between the abutting ends and the achievement of clean, mirror-type surfaces for the ends of the optical fibers. For example, it is ideal that the ends of the optical fibers be cleaved or cut so that the end surface is precisely perpendicular to the longitudinal axis of the optical fiber, although up to a three degree variation is tolerable. Additionally, the end surface is ideally mirrored and extremely smooth and polished, as opposed to having a "mist" type surface, a "hackled" type surface or a spurred end. With these latter types of surfaces and ends, it is necessary to polish the end surfaces to provide for an effective and suitable end surface for splicing. The achievement of these desired objectives are further complicated by the extremely small nature of the optical fibers, the thickness of which often approximates that of a human hair.

An improved method and tool for achieving these objectives is disclosed in U.S. application Ser. No. 017,344, filed on even date herewith, in the name of Logan et al and entitled "Method And Tool For Cleaving Fiber Optic Elements."

According to the method of that application, grooving means are first caused to traverse about the entire circumference of the fiber optic element to form a circumferential groove therein. Next, the fiber optic element is stressed in the vicinity of the groove in order to produce a clean failure thereat which will result in a clean, highly mirrored end surface for the cleaved element. The tool in accordance with the invention of that application comprises support means having a longitudinal axis for supporting the fiber optic element therealong, grooving means for grooving the surface of a fiber optic element, and means for mounting the grooving means to revolve about the longitudinal axis of the support means to groove the entire circumference of the fiber optic element. Once such a groove is formed in the fiber optic element, the fiber optic element may be stressed, such as for example by pulling of one end of the fiber optic element, to cleave the element into first and second portions and thereby produce a clean, mirrored end surface.

More particularly, the tool which is the subject of that application includes an elongated support handle for supporting a fiber optic element and a housing rotatably mounted on the support handle to rotate about the longitudinal axis of the handle. The housing includes a grooving element offset from the longitudinal axis and an engagement causing auxiliary support member which is normally biased away from the grooving element but which is movable to a position for causing the grooving element to engage the fiber optic element. The support member includes two spaced supporting legs for supporting a portion of the fiber optic element and moving it into engagement with the grooving element positioned between the spaced legs so that the fiber optic element is slightly deflected or bowed to provide a self-compensating feature for forming deeper grooves in relatively thick fiber optic elements and shallower grooves in relatively thin fiber optic elements.

SUMMARY OF THE INVENTION

The present invention constitutes an improvement over the tool of the aforementioned copending application entitled "Method And Tool For Cleaving Fiber Optic Elements". According to one aspect of the present invention, the improved tool comprises support means having a longitudinal axis for supporting the fiber optic element therealong, grooving means for forming a groove in the surface of the fiber optic element, engagement causing means for causing engagement of the grooving means with the fiber optic element, and mounting means for mounting the grooving means to revolve about the longitudinal axis of the support means to circumferentially groove a fiber optic element about its entire circumference. The engagement causing means is movable between a first position in which the grooving means is adapted to engage the fiber optic element and a second position in which the grooving means is adapted to be spaced from the fiber optic element. Also, the engagement causing means is normally biased towards the first position.

In this way, the normally biased engagement causing means serves to ensure that the fiber optic element and the grooving means are in engagement, irrespective of the diameter of the fiber optic element to be cleaved. Furthermore, by providing a high magnitude biasing force, the engagement causing means can compensate to produce a greater biasing force for relatively thicker fiber optic elements, thereby ensuring that at least a desired depth for the groove is obtaioned.

According to another aspect of the present invention, the improved tool comprises support means having a longitudinal axis for supporting the fiber optic element therealong, grooving means for forming a groove in the surface of the fiber optic element, engagement causing means for causing engagement of the grooving means with the fiber optic element, and mounting means for mounting the grooving means to revolve about the longitudinal axis of the support means to circumferentially groove a fiber optic element about its entire circumference. The grooving means includes a stop surface spaced from the longitudinal axis and a grooving tip extending a predetermined distance beyond the stop surface, and the engagement causing means causes engagement of the fiber optic element with the stop surface so that the grooving tip extends a predetermined distance into the fiber optic element to thereby produce a groove in the fiber optic element (after revolutional movement of the grooving means about the longitudinal axis of the support means) having a depth substantially equivalent to the predetermined distance. Thus, in this manner, the depth of the groove can be precisely and accurately controlled.

In the preferred embodiment, the improved tool embodies both of these aspects in having the engagement causing means comprise an auxiliary support member mounted for movement in a direction transverse to the direction of the longitudinal axis and including bias means for biasing the auxiliary support member toward a position in which the fiber optic element is in engagement with the stop surface of the grooving means.

These and further features and characteristics of the present invention will be apparent from the following detailed description in which reference is made to the enclosed drawings which illustrate the preferred embodiment of the present invention.

BRIEF DESCRIPTION OF THE DRAWINGS

FIG. 4 is an enlarged cross-sectional view of the grooving element and the fiber optic element engagement causing block showing the block in an engaging position, and in dotted outline, in a disengaged position.

DETAILED DESCRIPTION OF THE PREFERRED EMBODIMENT

Figure 1:
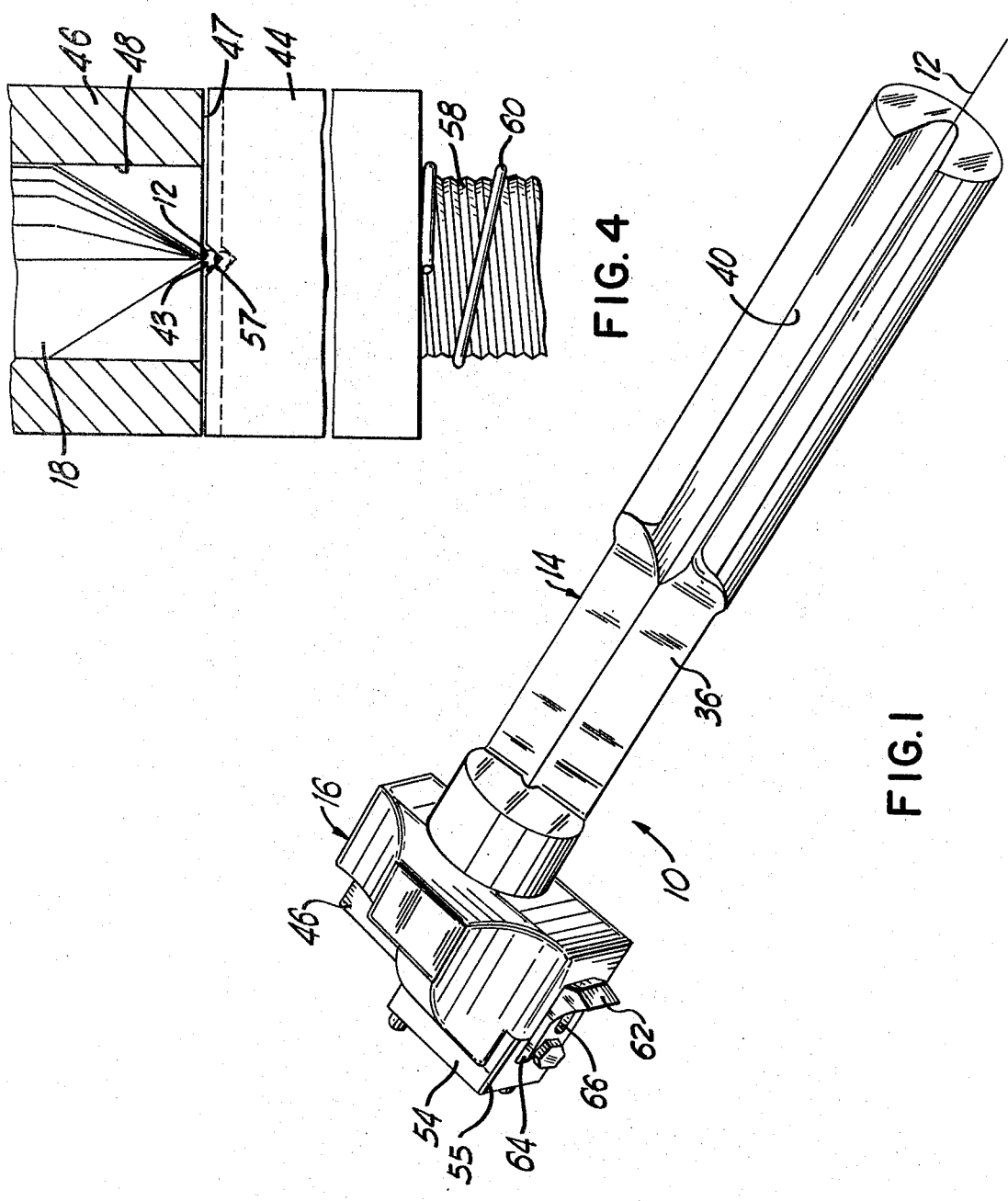
FIG. 1 is a perspective view of the grooving tool in accordance with the present invention.
Figure 2:
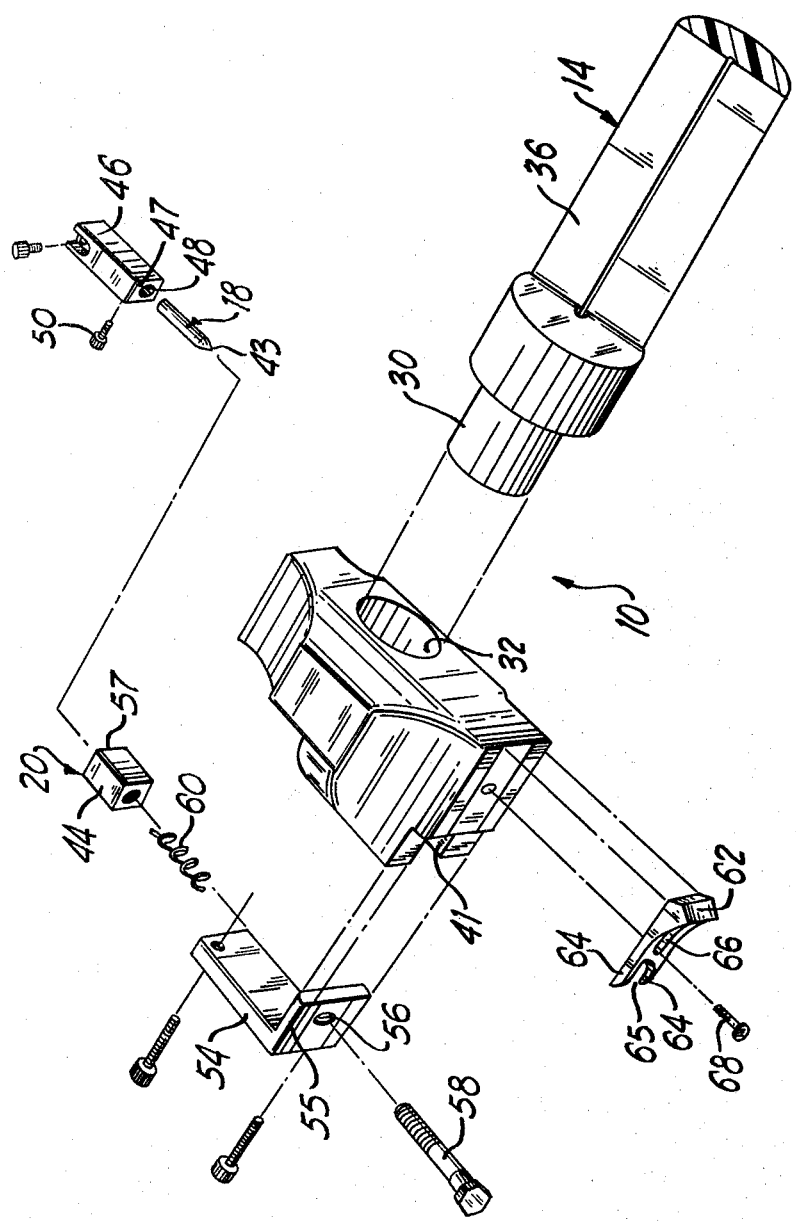
FIG. 2 is an exploded perspective view of the grooving tool shown in FIG. 1.
Figure 3:
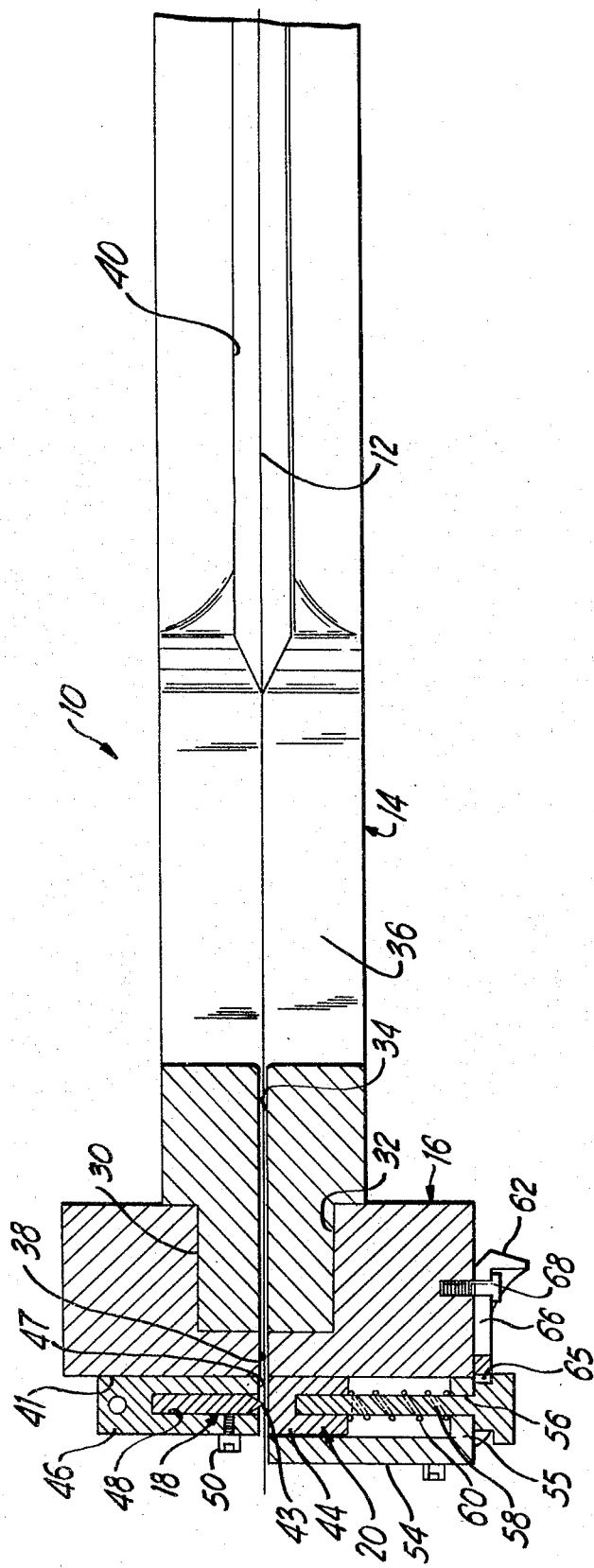
FIG. 3 is a longitudinal cross-sectional view of the grooving tool of FIG. 1.

Referring now to the drawings in which like reference characters represent like elements, there is shown in FIGS. 1-3, a grooving tool 10 constructed in accordance with the present invention which may be used in cleaving of fiber optic elements 12 preparatory to a splice or joining of two such elements. The grooving tool 10 comprises generally an elongated support handle 14 and a housing 16 removably rotatably mounted on one end thereof. The housing 16 includes generally a grooving element 18 and an engagement causing means 20 for moving of a fiber optic element 12 inserted into the housing 16 into engagement with the grooving element 18. In operation, a fiber optic element 12 to be cleaved is inserted through an appropriate opening in the forward end of the elongated support handle 14 to pass through an aligned opening in the housing 16 and to extend therebeyond. A portion of the fiber optic element 12 within the housing 16 is then moved into engagement with the grooving element 18 and the housing 16 rotated relative to the elongated handle 14 for a full 360° while at the same time the element 12 is held against rotation (such as for example by placement of a thumb of an operator thereon) to form a circumferential groove in the surface of the element 12. The end of the fiber optic element 12 protruding through the end of the housing 16 opposite from the elongated handle 14 may then be simply pulled away from the housing 16, thereby severing or cleaving the fiber optic element 12 into first and second portions, each of which has a mirrored-type end surface suitable for subsequent splicing or joining thereof to another optic element or other article.

More particularly, the elongated handle 14 includes a reduced cylindrical portion 30 which is adapted to be inserted into a cylindrical bore 32 in the housing 16 but which is not necessarily retained therein. Alternatively, means could be provided for removably rotatably mounting the housing 16 on the end of the handle, such as for example, the means shown and discribed in the aforementioned application Ser. No. 017,344.

As best seen in FIG. 3, the cylindrical bore 32 substantially conforms to the cylindrical surface of the reduced forward end 30 of the handle 14 so as to be freely rotatable relative thereto. A small central bore 34 extends from a recessed portion 36 of the handle 14 forwardly through the reduced front end 30. This small bore 34 is adapted to be in precise alignment with the central fiber optic element receiving bore 38 of the housing 16 coaxially aligned with the enlarged bore for the forward end 30 of the handle 14. The rearward end of the handle includes an elongated slot 40 on which the fiber optic element 12 is adapted to rest. In this manner, a fiber optic element to be cleaved may be simply and easily placed in the slot 40, pushed forward through the bore 34 towards the housing 16, through the receiving bore 38 and then beyond the end of the housing 16.

The housing 16 includes a suitable recess 41 in the end surface thereof in which the grooving element 18 is supported in opposing relationship to an auxiliary support member 44 of the engagement causing means 20. The auxiliary support member 44 is adapted to be movable relative in the housing to receive a fiber optic element 12 inserted into the housing 16 and move it into engagement with the grooving element. The grooving element 18 preferably comprises a diamond or hard metal cutting or scoring element having a chisel edge supported in a shank 46 which in turn is mounted in the housing 16 in fixed relationship with respect to the fiber optic element receiving bore 38. For example, the grooving element 18 is mounted in a recessed bore 48 of the shank 46 by means of a set screw 50.

The auxiliary support member 44 for causing engagement of the fiber optic element 12 with the grooving element 18 comprises a support block having a V-shaped notch 57 in the end surface thereof facing the grooving element 18 and which is spring biased towards the engagement causing position. This biasing is accomplished by means of an L-shaped cover member 54 adapted to be secured to the housing 16, such as with means of screws, and having a bore 56 in one leg 55 thereof through which a threaded screw member 58 is adapted to pass and threadably engage the support block 44. A coiled spring 60 is provided coaxially mounted on the threaded screw 58 between the support block 44 and the leg 55 of the cover 54. The coil spring 60 thus serves to force the block 44 toward the grooving element 18. To move the support block 44 to the non-engaging position to allow for easy insertion of a fiber optic element 12, there is provided a camming member 62 having a pair of spaced legs 64 defining a first slot 65 in the end thereof, and having a second slot 66 through which a mounting screw 68 passes and is threadably secured to the housing 16 to allow for relative sliding movement of the camming member 62. The pair of spaced legs 64 are each inclined so as to be adapted to engage the head of the threaded screw 58 to cam the screw 58 outwardly and away from the cover leg 55 when slid toward the end of the housing 16. That is, the inclined legs 64 of the camming member 62 engage the enlarged head of the threaded screw 58 and force same away from the cover leg 55. Retraction of the camming member 62 serves to release the screw 58 to be under the influence of the biasing spring 60 to force the support block 44 toward the engagement causing position.

Thus, the engagement causing auxiliary support member 44 is normally biased toward the engaged position but is movable to a non-engaging position to allow for easy insertion of a fiber optic element 12 into and through the housing 16 by movement of the camming member 62 toward the free end of the housing 16. When a fiber optic element 12 has been positioned in the elongated handle 14 and inserted through the housing 16, the camming member 62 is moved to its release position, thereby allowing the support block 44 to move the fiber optic element 12 into engagement with the grooving element 18. The housing 16 may then be rotated about the elongated handle 14 to form a groove about the entire circumference of the fiber optic element 12. The fiber optic element 12 may then be simply stressed in the vicinity of the groove, such as for example by pulling the protruding portion outwardly in a direction away from the elongated handle 14 to cause failure along the plane defined by the groove to provide a smooth, mirror-type finished end surface.

It is to be noted that the formation of a groove about the entire circumference of the fiber optic element 12 precisely and accurately defines the plane of failure and thus the plane of the finished end surface which preferably will be perpendicular to the longitudinal axis of the fiber optic element 12. Further, it will be appreciated that, because of the very small nature of the fiber optic elements, the amount of force required in causing failure of the fiber optic element 12 is minimal. Thus, the function of the groove is simply to define the location and plane of failure, and not necessarily to cause the failure itself. Further in this regard, it has been found that it is not necessary with the tool 10 of the present invention to remove the protective cladding or lacquer which often surrounds the core of the fiber optic elements prior to the formation of the groove in the surface of the element 12.

It is also to be noted that there is no deflection of the fiber optic element 12 at the location of engagement with the grooving element 18 since the fiber optic element is continuously supported between the ends of the support block 44.

As best seen in FIG. 4, the V-shaped notch in the block 44 has a depth which is less than the diameter of the fiber optic element 12 to be grooved. When the fiber optic element 12 is moved into engagement with the grooving element 18, the bottom surface 47 of the shank 46 provides a stop for movement of the support block 44. For comparison purposes, the dotted outline in FIG. 4 shows the position of the support block 44 in the non-engaging position. Thus, by precisely controlling the distance that the tip 43 of the grooving element 18 extends beyond the end surface 47 of the shank 46, the depth of the groove for all fiber optic elements 12 can be precisely controlled. That is, if it is desired that the score depth for any fiber optic element not be any greater than say two microns, then the tip 43 of the grooving element 18 can be set to extend beyond the end surface 47 of the shank 46 only two microns, and the depth of the groove in the fiber optic element 12 will never be any larger than this depth, namely two microns. Further, with the force of the coil spring 60 large enough to maintain the fiber optic element 12 in engagement with the end surface 47 of the shank, the depth of the groove will be precisely equal to the extend that the tip 43 extends beyond the end surface 47 of the shank—namely, two microns in the example above. This is advantageous in ensuring that the depth of the groove to be formed in the fiber optic element is not any greater than necessary to ensure that the fiber optic element 12 will fail along the plane of the groove when stressed, and also in preventing overcutting which might otherwise cause the fiber optic element 12 to have a hackled or spurred surface. In this regard, it is to be noted that the desired score depth is dependent upon the type and diameter of the material used, but is preferably approximately 5% of the fiber diameter.

Thus, it can be seen that in accordance with the present invention, the biasing force of the spring 60 serves to provide the pressure necessary for ensuring that the depth of cut corresponds to the amount of extension of the tip 43 beyond the end surface 47 of the shank 46.

In this regard, it will be appreciated that the score depth of the groove formed in any fiber optic element 12 is dependent on the pressure applied by the grooving element 18 and the sharpness of the cutting edge thereof. For a given pressure, the sharper the cutting edge, the deeper the score, and for a given cutting edge, the greater the pressure, the deeper the score. With the tool 10 of the present invention, the pressure is provided by the spring 60 which serves to force the block 44 supporting the fiber optic element 12 toward and into engagement with the grooving element 18. Also, it is to be noted that this pressure is adjustable by screwing the threaded member 58 further into or further out of the support block 44. This also serves to adjust the limits for the end positions of the support block 44 in the engagement causing and disengaging positions.

Of course, the other features shown and discussed in the aforementioned U.S. patent application could also be provided in the tool 10 of the present invention. For example, indicator means could be provided for indicating and ensuring positively that 360° of rotation is obtained, a handle could be provided for rotating the housing 16 relative to the elongated handle 14, or different grooving elements could be employed in place of the grooving element 18 shown therein. Further, positive holding means could be provided for holding the fiber optic element 12 in the elongated handle 14 instead of using the operator's thumb.

Thus, it is seen that in accordance with the present invention, there is provided a new and improved tool 10 which is particularly useful for field operation wherein it is necessary to cleave fiber optic elements 12 for subsequent splicing. The tool provides a simple, relatively inexpensive yet reliable, convenient and rapid means for forming a groove about the entire circumference of a fiber optic element 12 which may then be stressed to sever the fiber optic element 12 to provide a clean, mirror-type end surface.

While the preferred embodiment of the present invention has been shown and described, it will be understood that such are merely illustrative and that changes may be made without departing from the scope of the invention as claimed.

What is claimed is:

1. In a tool for use in cleaving a fiber optic element into first and second portions, including a support means having a longitudinal axis for supporting a fiber optic element along said longitudinal axis, grooving means for forming a groove in the surface of the fiber optic element, engagement causing means for causing engagement of said grooving means with the fiber optic element, said engagement causing means being movable between a first position in which said grooving means is adapted to engage the fiber optic element and a second position in which said grooving means is adapted to be spaced from the fiber optic element, and mounting means for mounting said grooving means for rotational movement relative to said support means, the improvement wherein said engagement causing means comprises an auxiliary support member having a supporting portion for supporting said fiber optic element along a portion of its longitudinal length, mounting means for mounting said auxiliary support member for movement in a direction transverse to the direction of said longitudinal axis of said support means, and moving means for displacing said supporting portion of said auxiliary support member into position offset from said longitudinal axis of said support means in a direction towards said grooving means.

2. The tool of claim 1 wherein said grooving means includes a stop surface spaced from said longitudinal axis of said support means and a grooving tip extending a predetermined distance beyond said stop surface, and wherein said engagement causing means when in said first position causes engagement of the fiber optic element with said stop surface.

3. The tool of claim 2 wherein said grooving means includes means for adjusting the extent that said grooving tip extends beyond said stop surface.

4. The tool of claim 1 wherein said auxiliary member comprises a block member, and wherein said supporting portion is a surface of said block member defining a V-shaped groove in said surface facing said grooving means, said V-shaped groove being aligned with the longitudinal axis of said support means when said engagement causing means is in said second position.

5. The tool of claim 4 wherein said V-shaped groove of said block member extends continuously between a first longitudinal position and a second longitudinal position and wherein said grooving tip of said grooving means is located between said first and second longitudinal positions so that the fiber optic element is supported at the position said groove tip engages said fiber optic element.

6. The tool of claim 4 wherein said V-shaped groove for supporting a fiber optic element has a depth lesser than the diameter of the fiber optic element so that said fiber optic element engages said stop surface when said block member is in said first position.

7. A tool for use in cleaving a fiber optic element into a first and second portion, said tool comprising:
support means having a longitudinal axis for supporting a fiber optic element along said longitudinal axis;
grooving means for forming a groove in the surface of the fiber optic element, said grooving means including a stop surface spaced from said longitudinal axis, and a grooving tip extending a predetermined distance beyond said stop surface;
engagement causing means for causing engagement of a fiber optic element with said stop surface, said engagement causing means including an auxiliary support member comprising a supporting surface facing said grooving means, said supporting surface having a V-shaped notch for supporting the fiber optic element along a portion of its longitudinal axis, the depth of said V-shaped notch being less than the diameter of said fiber optic element; and
mounting means for mounting said grooving means for relative rotational movement about said longitudinal axis of said support means.

8. The tool of claim 7, wherein said auxiliary support member is mounted for movement in a direction transverse to the direction of said longitudinal axis of said support means between a first position in which the fiber optic element is adapted to be in engagement with said stop surface and a second position in which said fiber optic element is adapted to be spaced from said grooving tip.

9. The tool of claim 8, wherein said V-shaped notch is aligned with said longitudinal axis of said support means when said auxiliary support member is in said second position.

10. The tool of claim 9, further including bias means for biasing said auxiliary support member into said first position in which said supporting surface of said auxiliary support member is offset from said longitudinal axis of said support means in a direction towards said grooving means, wherein said engagement causing means when in said first position causes engagement of the fiber optic element with said stop surface.

11. The tool of claim 10, wherein said engagement causing means further includes moving means for moving said auxiliary support member against said bias means towards said second position.

12. The tool of claim 10, wherein said auxiliary support member includes a headed member extending therefrom transversely of said longitudinal axis and wherein said moving means includes means for engaging said headed member to move said headed member transversely in a first direction away from said grooving tip to move said auxiliary support member into said second position.

13. The tool of claim 12, wherein said bias means comprises a spring positioned to bias said auxiliary support member in a second direction opposite to said first direction.

14. The tool of claim 13, wherein said V-shaped notch of said block member extends continuously between a first longitudinal position and a second longitudinal position and wherein said grooving tip of said grooving means is located between said first and second longitudinal positions so that the fiber optic element is supported at the position said groove tip engages said fiber optic element.

15. The tool of claim 14, further including a housing for supporting said grooving means and said engagement causing means, and wherein said mounting means comprises rotation mounting means for rotatably mounting said housing on said support means to rotate about said longitudinal axis of said support means.

16. The tool of claim 15, wherein said rotation mounting means comprises a cylindrical recess in said housing coaxial with said longitudinal axis of said support means when said housing is mounted on said support means, and a cylindrical portion on said support means for insertion into said cylindrical recess of said housing, said cylindrical portion being coaxial with said longitudinal axis of said support means.

* * * * *